March 4, 1924.
K. F. HAIN
1,486,016
DRAWBAR ATTACHMENT
Filed Aug. 17, 1922
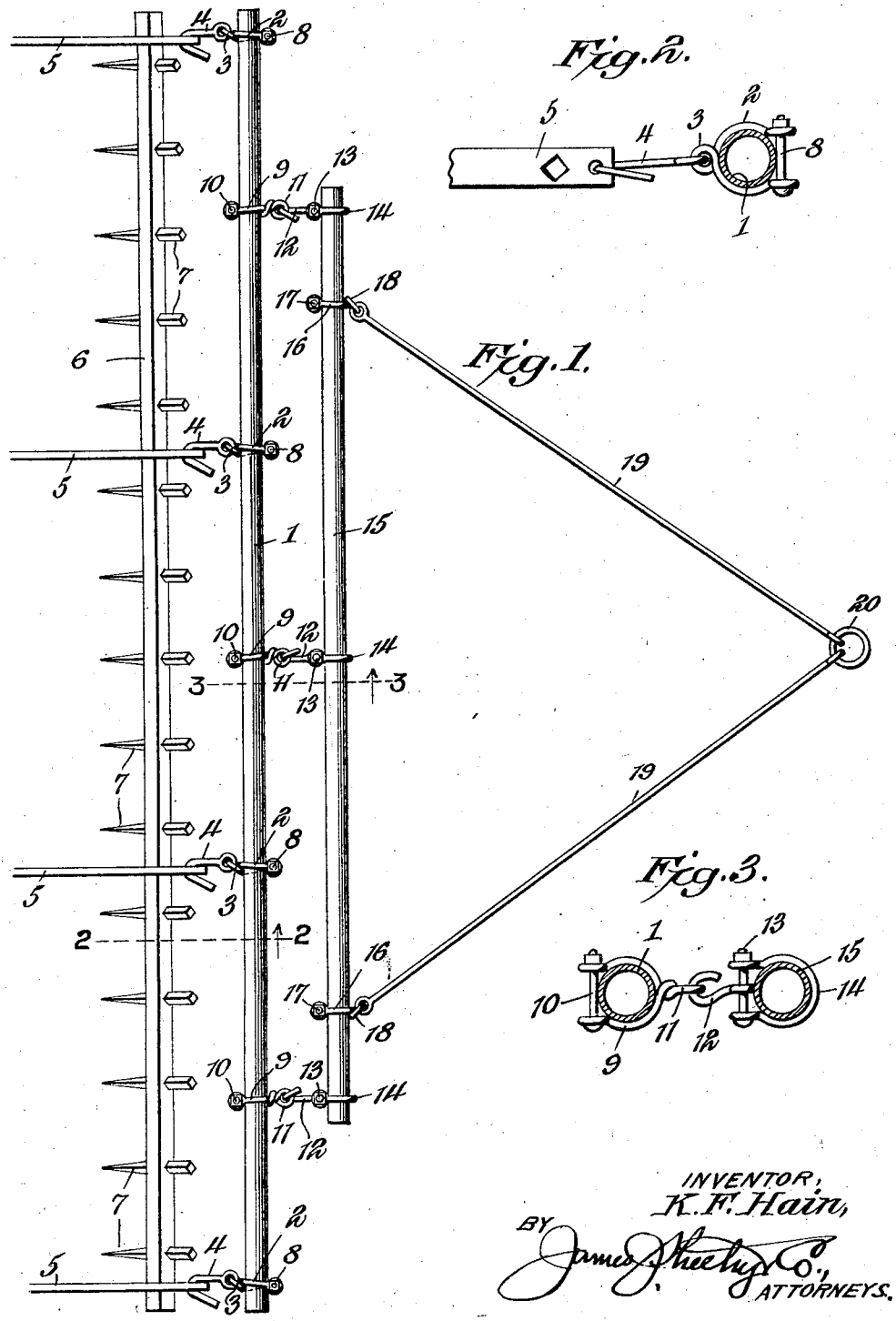

Patented Mar. 4, 1924.

1,486,016

UNITED STATES PATENT OFFICE.

KAREL F. HAIN, OF BEE, NEBRASKA.

DRAWBAR ATTACHMENT.

Application filed August 17, 1922. Serial No. 582,428.

*To all whom it may concern:*

Be it known that I, KAREL F. HAIN, a citizen of the United States, residing at Bee, in the county of Seward and State of Nebraska, have invented new and useful Improvements in Drawbar Attachments, of which the following is a specification.

My present invention pertains to drawbars for use in connection with harrows, and the particular feature of the invention is the manner in which the draw-bars are secured each to the other and ultimately connected with the harrow or other machine that it is desired to propel across a field through the medium of draft animals or the like.

The invention in all of its details will be fully understood from the following description and claims when the same are read in connection with the drawings accompanying and forming part of this specification in which:—

Figure 1 is a top plan view of my novel draw-bars as properly attached to a harrow.

Figure 2 is a view, taken in the plane indicated in the line 2—2 of Figure 1 and looking in the direction of the arrow.

Figure 3 is a similar view to Figure 2 taken in the plane indicated by the line 3—3 of Figure 1 and looking in the direction of the arrow.

Similar numerals of reference designate corresponding parts in all the views of the drawings.

My novel device comprises the draw-bar 1 that is formed of pipe as illustrated and it will be seen that unlike the wooden or other forms of draw-bar at present in use the pipe is not bored or provided with other apertures for the reception of clevises or similar means for securing the draw-bar to a harrow.

The clevis 2 comprises a band of wire or other bendable material that is looped at its inner end as indicated by 3 and is provided in said eye or loop with the hook 4 which is adapted to pass through an aperture or other opening in the frame work 5 of a harrow or the like. The band of the clevis 2 is provided with eyes that receive a pin or bolt 8 having fastening means such as a nut on the upper end thereof. Manifestly the band may be drawn tightly around the draw-bar 1 by means of the fastening nut and thus should the band expand during operation of the harrow the said band may be quickly and easily tightened with respect to the draw-bar 1. As shown in Figure 1 the frame 5 of the harrow is provided with the parallel bar 6 having the teeth 7 but in this connection I would state that none of these elements enter into my invention and are merely used for the purpose of illustration. It will also be manifest that as many of the clevis connection may be used as is desirable.

Extending parallel to the draw-bar 1 is a draw-bar 15 that is similarly constructed to the draw-bar 1 with the exception that it is slightly shorter than draw-bar 1. In order to secure the draw-bars 1 and 15 in proper position, I provide the clevises comprising a band portion 9 similar to the portion 2 of the before described clevises, and the band 9 is provided with a loop or eye 11 similar to the loop 3 and the band 9 is further provided with a bolt for relieving or increasing the tension on the bar 1 when desired.

Surrounding the bar 15 is a band 14 having eyes to receive a pin 13 by means of which the band may be slightly adjusted as the bands 2 and 3 are adjusted. By reference to Figure 3 it will be seen that I provide a hook 12 that takes into the loop 11 and is secured to the pin 13 whereby the bars 1 and 15 are retained at proper distances and at the same time are secured to each other.

The rods 19 are provided with eyes that receive rings 18 which in turn are received by the bands 16 that are adjustable with respect to the bar 15 by means of the pin and nut 17, and at their free ends are provided with a ring 20 for the reception of a trace or other connection from a draft animal or motor vehicle as the case may be.

It will be gathered from the foregoing that my novel draw-bars are formed of material and in such a manner as to withstand a large amount of rough usage and unlike draw-bars now in use no weakening apertures or integral parts are formed therein.

It will also be seen that the connecting means is inexpensive to produce and is quickly and easily adjusted and because of this fact slipping or casual displacement of one draw-bar with respect to the other is precluded.

Having described my invention, what I claim and desire to secure by Letters Patent is:—

1. In a draw-bar attachment, the combination of a comparatively small bar, cables secured to the bar, a comparatively long bar arranged in rear of the short bar and secured thereto by means of clevises; said clevises comprising loops open at one end and adapted to be firmly secured about the bars by means of bolts; one of said clevises having an eye formed therein and a hook arranged on one of the bolts adjacent the eye and secured thereto, a bar arranged in rear of the second bar and secured thereto by means of hooks and having teeth arranged thereon.

2. In draft means the combination of a short shaft, cables secured to the shaft, a comparatively long shaft adjacent the first shaft and in rear thereof, rings secured in removable manner on the shafts, bolts for closing the open end of the rings securely about the shafts, an eye produced in one of the rings and a hook secured on the bolt of the opposing ring, and a bar secured to the long shaft by means of hooks.

In testimony whereof I have hereunto set my hand in presence of two subscribing witnesses.

KAREL F. HAIN.

Witnesses:
H. D. LANDIS,
B. F. NORVAL.